Aug. 25, 1964 P. L. SAUNDERS 3,145,706
COMBINED FOOD CONTAINER AND HEATER
Filed April 4, 1961 4 Sheets-Sheet 1

Inventor:
Percy L. Saunders
By Mumm Ware
Atty.

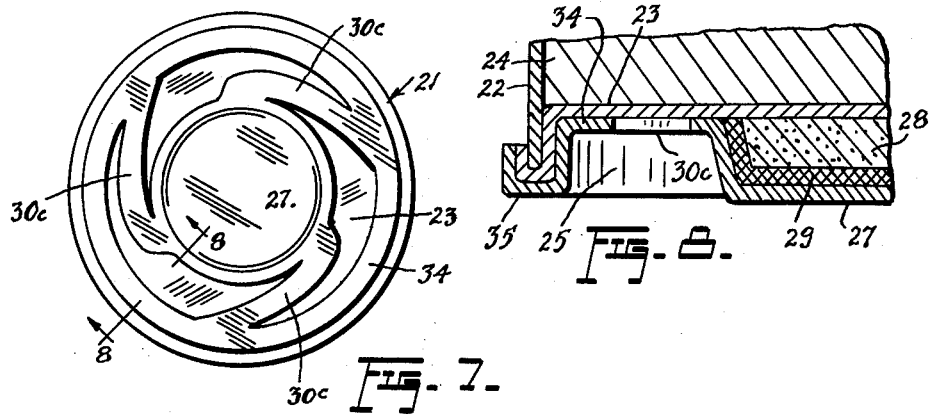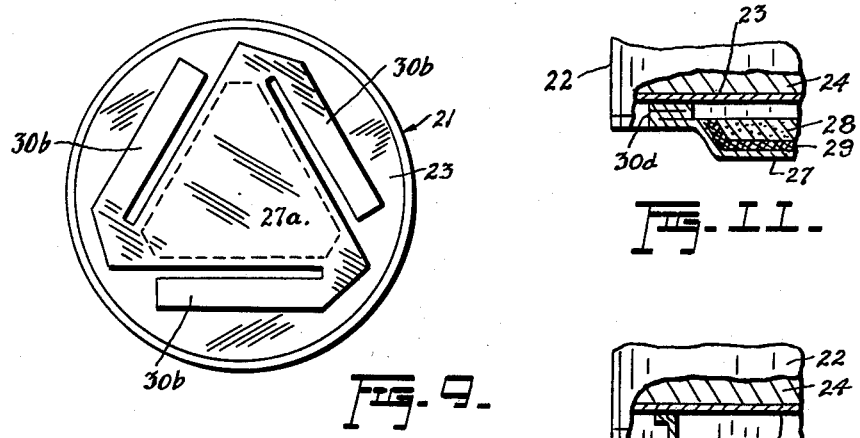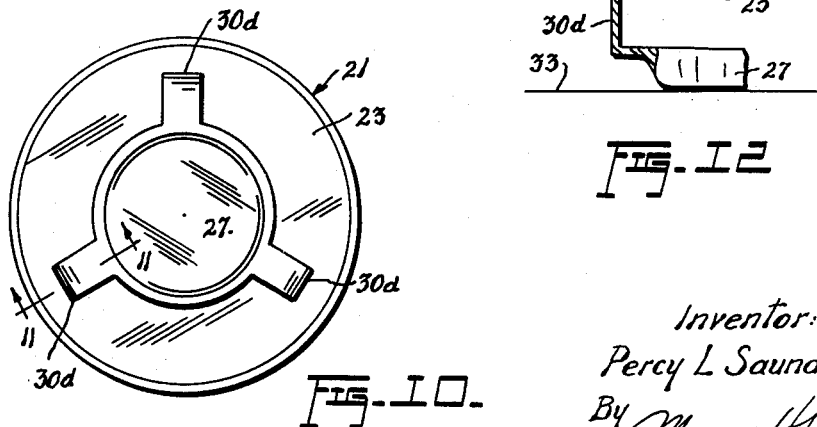

Aug. 25, 1964   P. L. SAUNDERS   3,145,706
COMBINED FOOD CONTAINER AND HEATER
Filed April 4, 1961   4 Sheets-Sheet 3
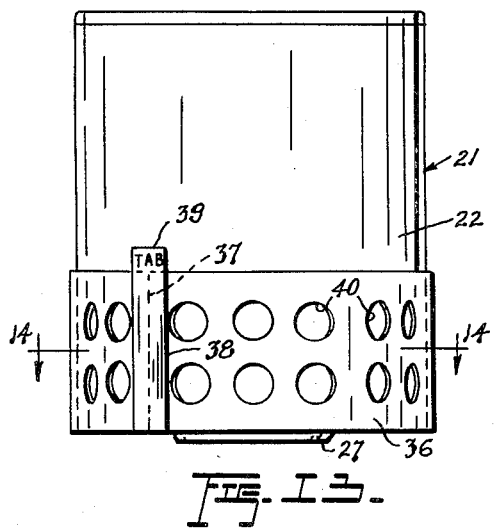
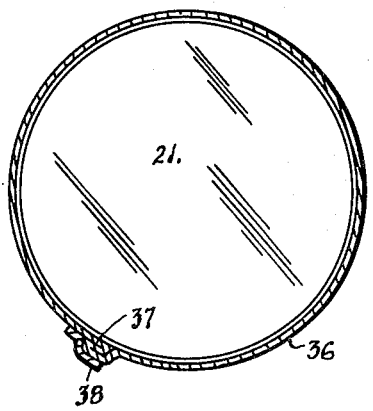
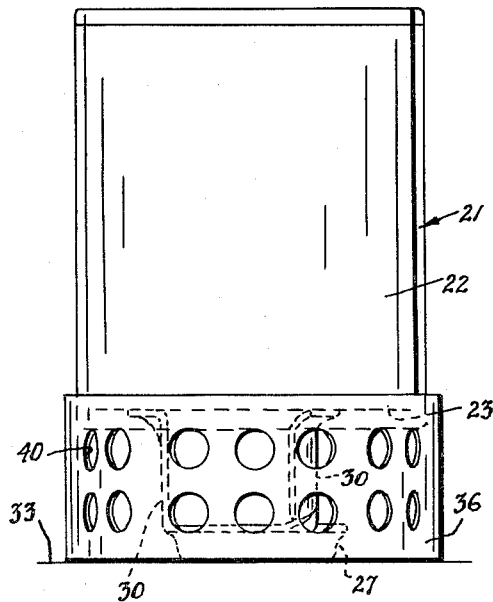
Inventor:
Percy L. Saunders
By Mumm H. Lane
Atty.

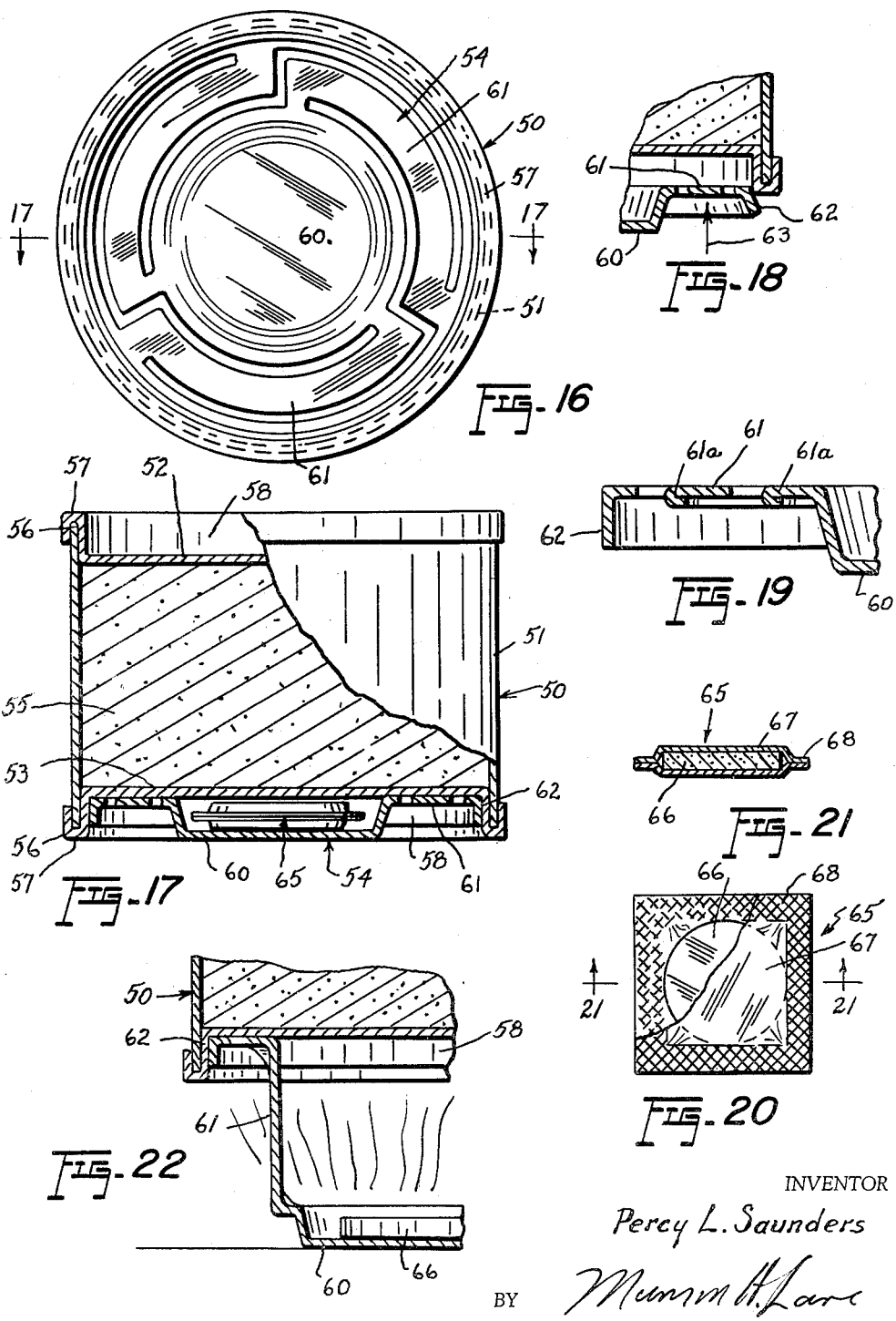

United States Patent Office 3,145,706
Patented Aug. 25, 1964

3,145,706
COMBINED FOOD CONTAINER AND HEATER
Percy L. Saunders, P.O. Box 183, Reidsville, N.C.
Filed Apr. 4, 1961, Ser. No. 100,727
18 Claims. (Cl. 126—262)

This invention relates to new and useful improvements in the art of heating canned food, and the principal object of the invention is to facilitate simple, efficient, economical and convenient heating of canned food in its container prior to consumption.

Heretofore there have been various devices intended to accomplish the aforesaid objects. These have had certain drawbacks which render them uneconomical for the following reasons:

(1) The intricate design of the heating element itself;
(2) The requirement of a can with a specially recessed bottom; or
(3) The fact that the heating element occupied space outside of the main dimensions of the food container.

Among the objects of the present invention are to provide:

(1) A self-contained heating unit which may be attached and become an integral part of any standard double seamed tin can of commercial popularity in a fashion that precludes the heating apparatus from protruding beyond the main dimensions of the can when not in operation;

(2) A specially designed heating unit consisting of only one metal part designed to utilize the principle of friction lock in attaching the unit permanently to the inner periphery of a can's double seam;

(3) A heating unit which requires only one simple operation on the part of the consumer in erecting the element for the heating operation;

(4) A heating unit designed to hold a fuel supply, enclosed in a watertight pocket adjacent to the can when not in use and to provide support for the can;

(5) A combustion space and receptacle for the fuel during the heating operation, in such a manner as not to require the disconnection of any part of the heating unit or require the use of tools to erect it for the heating operation.

Another important feature of the invention resides in the provision of heating means of a self-contained nature which are accommodated in a receptacle attached to the bottom of a can of food, such heating means being readily combustible, as by lighting with a match, so that the contents of the can may be quickly and easily heated when required, without the use of external equipment such as stoves, grills, et cetera.

Another important feature of the invention resides in the provision of novel means for attaching the receptacle with the heating means to the bottom of the can, such attaching or connecting means initially holding the receptacle closely adjacent the bottom of the can so that the heating means are unobstrusive while not in use, but permitting the receptacle with the heating means therein to be retracted away from the bottom of the can, not only to provide a combustion chamber or space under the can bottom, but also to afford convenient means whereby the entire device, including the can, may be sustained on any suitable supporting surface.

A further object of the invention is to provide a simple attachment for a conventional can, which attachment includes a fuel receptacle portion, and which may be stamped from a single sheet of material, preferably metal, said attachment being readily secured to either end of the can, where it is substantially housed within the normal end recess thereof, the fuel receptacle portion of the attachment being capable of being withdrawn from the end of the can by a single endwise pulling and twisting movement to a fully withdrawn position, without separation of the attachment from its connection with the can.

Another important feature of the invention resides in the provision of a windshield which is associated with the can and is adapted to enclose the combustion space or chamber below the bottom of the can when the heating means are in their operative position, thus protecting the flame of the heating means against wind or other adverse conditions when the device is in use.

The present application is a continuation in part of my prior application Serial No. 827,629, filed July 16, 1959 now abandoned.

The invention will be more readily understood by reference to the accompanying drawings and the following detailed description in which specific embodiments of the invention are set forth by way of illustration rather than by way of limitation.

In the drawings:

FIGURE 7 is a bottom plan view, similar to that shown in FIGURE 2 but illustrating a modified embodiment of the attachment means for the heater;

FIGURE 8 is a fragmentary sectional detail on an enlarged scale, taken substantially in the plane of the line 8—8 in FIGURE 7;

FIGURE 9 is a bottom plan view, similar to that shown in FIGURES 2 and 7 but illustrating another modified embodiment of the attachment means for the heater;

FIGURE 10 is a bottom plan view showing another modified form;

FIGURE 11 is a fragmentary sectional detail, taken substantially in the plane of the line 11—11 in FIGURE 10, with the attaching means in the initial position;

FIGURE 12 is a fragmentary sectional detail, similar to that shown in FIGURE 11 but illustrating the heater attaching means retracted;

FIGURE 13 is a side elevational view of the device shown in FIGURE 1 but with the windshield in position on the can;

FIGURE 14 is a sectional view, taken substantially in the plane of the line 14—14 in FIGURE 13 but with the can shown in top plan;

FIGURE 15 is a side elevational view, similar to that shown in FIGURE 13 but with the windshield in its operative position;

FIGURE 16 is an underside plan view similar to FIGURE 7 showing a further modification;

FIGURE 17 is a vertical sectional view, taken substantially in the plane of the line 17—17 in FIGURE 16;

FIGURE 18 is a fragmentary vertical sectional detail showing the outwardly flared marginal edge portion of the heating unit of FIGURES 16 and 17 prior to its attachment to the can;

FIGURE 19 is an enlarged, fragmentary sectional detail showing a slightly modified arrangement utilizing rolled or turned edges of the arms and receptacle of the heating device;

FIGURE 20 is a plan view, partly in section, of the fuel element within its water proof envelope;

FIGURE 21 is a sectional view, taken substantially in the plane of the line 21—21 in FIGURE 20; and FIGURE 22 is a fragmentary vertical elevational view of the heating device pulled away from the bottom of the can in readiness for use, the envelope of the fuel element having been removed.

Figure 2:
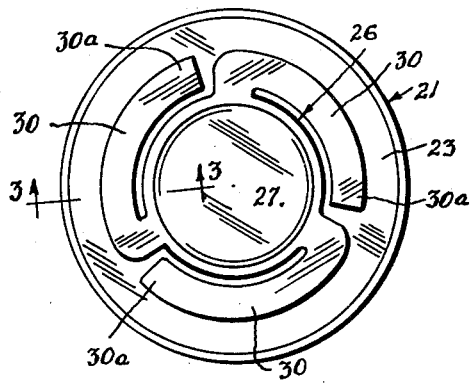
FIGURE 2 is a bottom plan view thereof.

Referring now to the accompanying drawings in detail, more particularly to FIGURES 1-6 inclusive, the invention comprises a combined food container and heater designated generally by the reference numeral 20, which consists of a conventional food can 21 including a side wall 22 and a bottom 23, the contents of the can being indicated at 24. As is customary in conventional can construction, the flat bottom 23 is elevated somewhat above the lower edge of the side wall 22 as shown, thus providing a space or recess 25 under the bottom wherein the heating means 26 may be accommodated. It will be understood that while the top end of the can is not shown in this figure, the opposite ends of the can are or may be interchangeable, as is customary in cans of this type, so that similar recesses are formed at each end of the can within either of which a suitable heating means may be housed. The term "bottom" as used herein may be applied also to the opposite end of the can.

While for purposes of illustration, the heating means 26 have been shown relatively large in proportion to the depth of the space 25 under the bottom 23 so that as shown the heating means projection below the lower edge of the side wall 22 of the can, in actual practice the relative proportions are preferably such that the heating means may fit flush under the can, without any protrusion and thus do not interfere with conventional positioning of the can on a supporting surface wherein the lower edge of the side wall or the usual crimp 23a at the marginal edge of the can bottom is in contact with the supporting surface. Nevertheless, even if the heating means 26 project below the lower edge of the can, a space similar to the space 25 usually exists at the top of the can and the projecting portion of the heating means may be received therein when one can is stacked on top of another, as will be clearly apparent. In addition, the invention is also adaptable for use with cans which do not have a space or recess such as that shown at 25 but have their bottom coplanar with the lower edge of their side wall, inasmuch as the underside of the heating means 26 is substantially flat and large enough to rest on a supporting surface without requiring contact between the supporting surface and the can itself.

In any event, the heating means 26 comprises a dish-shaped receptacle 27 which contains a heating element 28 in the form of combustible, solid fuel such as wax, or the like. Although any suitable fuel may be employed, the preferred fuel consists of a mixture of stearine, esters of amino or imino acids together with a small quantity of an oxidizing salt such as ammonium nitrate. A fuel of this type produces a smokeless flame and has a higher melting point than common candle wax, in addition to producing a hotter flame than that attained by the use of wax alone. A suitable wick 29 is embedded in the fuel 28 and has the ends thereof exposed as indicated at 29a to facilitate ignition, such as by a match, or the like.

Means are provided for attaching the heating means 26 to the can 21, these means comprising a plurality of elongated, deformable members 30 which, at one end thereof, may be formed integrally with the marginal edge of the receptacle 27, while their other end portions 30a are welded, fused, soldered, or otherwise suitably secured to the bottom 23 of the can 21.

Figure 1:
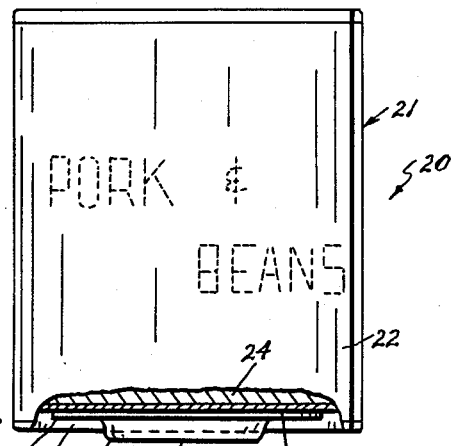
FIGURE 1 is a side elevational view, shown partly in section, of a food can with heating means in accordance with the invention.
Figure 4:
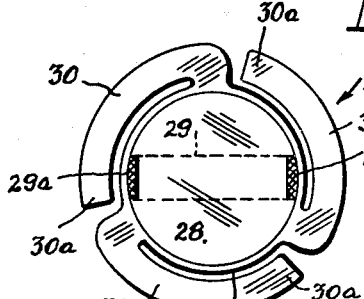
FIGURE 4 is a top plan view of one form of the heating means per se.
Figure 3:
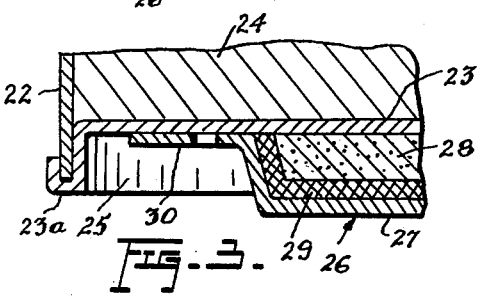
FIGURE 3 is a fragmentary sectional detail on an enlarged scale, taken substantially in the plane of the line 3—3 in FIGURE 2.
Figure 5:
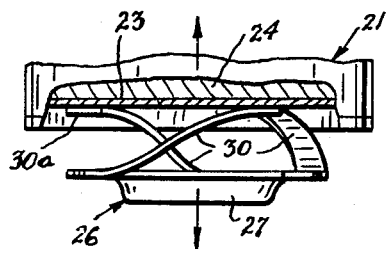
FIGURE 5 is a fragmentary side elevational view, similar to that shown in FIGURE 1 but illustrating the heating means partly retracted from the can.

The members 30 are normally or initially flat and lie against the can bottom, preferably being curved so as to be disposed in a complemental arrangement circumferentially around the marginal edge of the receptacle 27 when the latter is flush against the bottom of the can, as shown in FIGURES 1, 2 and 3. However, by virtue of the deformability of the members 30, the attaching means provided by these members is extensible, in the sense that the receptacle 27 may be pulled away or retracted from the bottom of the can while remaining attached to the latter by the members 30 as illustrated in FIGURE 5. Moreover, the receptacle may be turned or rotated relative to the can so that the points of connection of the members 30 to the receptacle are substantially vertically aligned with the points of connection of the member portions 30a to the can bottom, while the members 30 themselves, although somewhat longitudinally twisted, are reasonably fully extended and the receptacle 27 is disposed at a substantial distance from the bottom of the can as illustrated in FIGURE 6.

In such a position, the spacing of the receptacle from the can bottom provides a combustion space or chamber 31 at the underside of the can, so that the fuel 28 in the receptacle may burn properly, as indicated at 32. Moreover, the receptacle 27 coacts with the members 30 in sustaining the can 21 above a suitable supporting surface 33 on which the receptacle is positioned, it being understood, of course, that the members 30, although deformable, are sufficiently rigid to retain the shape to which they are deformed and support the can without collapsing.

Figure 6:
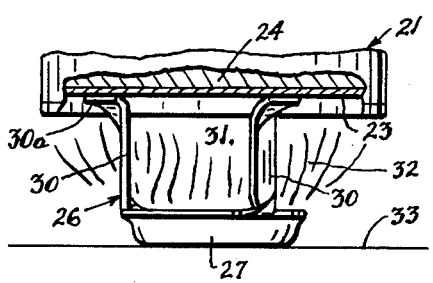
FIGURE 6 is a fragmentary side elevational view, similar to that shown in FIGURE 5 but illustrating the heating means fully retracted and in operation.

When the device is set up for operation as shown in FIGURE 6 and the contents of the can are heated, both the can and the associated heating means, of course, may be discarded when the contents of the can are emptied.

As will be apparent the heating receptacle 27 and the attaching arms 30 may be readily formed from a sheet of deformable material in a single stamping operation. The material from which these members are formed is preferably relatively thin and, as shown, may be of substantially the same thickness as the material from which the cans themselves are formed, and preferably the entire attachment, including the receptacle 27 and the attaching arms, are formed of the same material as the can ends themselves.

In a slightly modified form of the invention shown in FIGURE 9, the heating element receptacle 27a is polygonal rather than circular in form, the attaching members 30b being arranged complementary thereto, as shown.

In another modified form shown in FIGURES 7 and 8, the attaching members 30c extend outwardly from the marginal edge of the receptacle 27 but, instead of having their outer extremities secured directly to the can bottom 23, they are connected to or formed integrally with an annular member 34 which, in turn, is crimped or beaded over the connection of the can bottom with the can side wall, as illustrated at 35. Thus, the heating means may be applied to any conventional can without requiring a welded or soldered connection of the members 30c to the bottom of the can itself.

Here again the entire attachment, including the receptacle 27, attaching arms or members 30c, annular member 34 and the crimped or beaded portion 35, may be formed from a single sheet of material in a stamping operation.

In another modified form of the invention shown in FIGURES 10, 11 and 12, the deformable and/or extensible attaching or connecting members 30d are initially folded in an accordion fashion into a zig-zag form as is best shown in FIGURE 11, but may be extended in a straight downward direction when the receptacle 27 is retracted from the can, as shown in FIGURE 12.

The accompanying FIGURES 13, 14 and 15 illustrate a windshield equipment which may be used in conjunction with any of the embodiments of FIGURES 1–12 as a coacting component of the invention. As such, it involves the provision of a strip or sheet of non-combustible material which constitutes the windshield 36, the same being wrapped circumferentially around the bottom portion of the can side wall 22 so as to initially lie flush thereagainst, but having an overfold 37 which is initially held against the side of the can by a suitable keeper strip 38 provided with a coating of adhesive, or the like, for retaining the same in place. As will be noted, the keeper strip 38 is equipped with a pull tab 39 and when the keeper strip is removed, the windshield may be expanded to a larger diameter than the can 21 by simply unfolding the overfold 37, whereupon the windshield may be slid downwardly along the can, after the heating means 26 have been set up as shown in FIGURE 6, so that the windshield encloses the combustion space or chamber 31 and protects the burning flame from the effects of wind or other undesirable conditions. The windshield is provided with a plurality of vent apertures 40 for entry of air into the space 31 to support combustion as well as for exit of products of combustion from said space.

An important embodiment of the invention is shown in FIGURES 16 to 22, in which the heating attachment unit includes three separate parts which will be more fully described herienafter, namely (1) a single metal stamping comprising a central fuel receptacle or pan, (2) attaching arms formed integral with the pan, and (3) an outer rim or ring member to which the attaching arms are secured, the ring or rim being adapted to fit snugly within one of the recessed ends of a conventional can. The periphery of the outer rim or ring is turned up at an angle intermediate or approaching 90° from the horizontal so as to accomplish connection by friction lock along the inner periphery of the double seamed can end. The arcuate arms are given a "set" or spring inwards during the stamping process, thus taking advantage of their inherent resilient properties to hold the fuel receptacle snugly against the can end during the retaining function. For the heating operation the arcuate arms are sprung or "set" in the extreme and opposite direction by a pulling-twisting motion, thus forming a combustion space between the fuel receptacle and can bottom, and a base of sufficient rigidity to support the can during the heating operation. No prying tools, keys, etc., are required in performing the erection. The edges of the arcuate arms and fuel receptacle are preferably rolled or turned to prevent injury to the fingers in the erection operation.

The heating element may be installed on a standard double seamed metal can end, and when installed in the stowed position it will not extend beyond the main dimensions of the can.

The installation may be accomplished with the hands without tools, or it may be installed by automatic machining presently available, depending on production volume required. This is an important advantage gained over previous designs in addition to the fact that a can of special design is not required for use with the heating device. In effect it widens the market potential at the food packer level by allowing the use of cans or cartons that are normally stocked, thus precluding the requirement of an inventory of cans of special design and/or shipping cartons of special size. Also, it extends the market downward from this level all the way to the ultimate consumer who may select canned food of his desire at the retail store and install the heating element on the cans himself.

This embodiment of the device (FIGURES 16–22) will now be more specifically described with reference to the drawings themselves.

In FIGURE 17 there is shown a conventional can 50 having a cylindrical side wall 51, the diameter of which is somewhat greater than the distance between its two opposite ends 52, 53. This squat type of can is found to be particularly adapted for use with my improved heater attachment 54, since the contents 55 of the can are more readily heated in a can where the distance between the ends is greater than the diameter of the can. The can is of the conventional double seamed type, in which the normally flat ends 52, 53 are spaced inwardly from the terminal edge portions 56, 56 of the side wall 51, and are provided with peripheral flange portions 57 which are turned over the edge portions 56 of the side wall in the usual manner. In this manner natural recesses 58, 58 are formed, one at each end of the conventional can, and it is in one such end recess that my heater attachment is adapted to be housed, as hereinafter described.

In common with the previously described embodiments of my invention the heater attachment 54 comprises a single stamping preferably formed from sheet metal of a thickness approximately equal to the thickness of the can walls. Such stamping includes the downwardly dished fuel receptacle portion 60 provided with a plurality of normally flat curved or inclined attaching arms 61 each integrally connected at its inner end with the separate fuel receptacle portion 60 and at its outer or peripheral end with a continuous rim, ring or circular portion 62 which, as shown in FIGURE 22, is initially inclined outwardly, but when the attachment is forced into one of the end recesses 58, preferably by the use of a suitable tool applied in the direction of the arrow 63 (FIGURE 18) the rim 62 of the heater attachment or unit will be formed into the outer rim of the can and will be held in a snug or locking fit, as will be apparent from FIGURES 17 and 22. This fit is similar to that shown in FIGURE 8 except that in the present embodiment the outer flange 35 of FIGURE 8 is omitted as unnecessary in view of the tightness of the fit between the heating attachment and the can bottom. Thus there is no danger of the attachment coming loose when the fuel receiving portion is pulled downwardly to the heating position shown in FIGURE 22. Preferably the edges of the attaching arms 61 and of the receptacle 60 are bent over as at 61a in FIGURE 19 to avoid danger of cutting the fingers of the user.

A fuel element 65 is shown in FIGURES 20 and 21 and comprisese a solid fuel portion 66 contained within a waterproof jacket or container 67 having an outwardly projecting flange portion 68. The jacket or casing may be of any suitable waterproof material, such as cellophane, to protect the fuel 66 from dampness. The jacket may be of two-piece construction and its edges or flanges 68 heat fused. If desired a jacket containing flammable material such as nitrocellulose may be employed to serve the dual purpose of a container for the fuel and a wick to assist in igniting the fuel. The fuel 66 may be of any suitable composition, that described in connection with heating element 28 being found particularly satisfactory.

While in the foregoing there have been described and shown the preferred embodiments of the invention, various modifications may become apparent to those skilled in the art to which the invention relates. Accordingly, it is not desired to limit the invention to this disclosure, and various modifications may be resorted to, such as may lie within the spirit and scope of the appended claims.

What is claimed as new is:

1. A combined food container and heater, comprising a conventional can having a side wall and a substantially flat end spaced slightly inwardly from the lower edge of the side wall to form a recess having an outer rim, and a heating attachment comprising an integral stamping formed from sheet material and including a fuel receptacle having means for attaching the same to the can bottom, comprising a plurality of deformable arms integral with the fuel receptacle, said receptacle being adapted to be initially housed in said recess in the can bottom but being retractable therefrom.

2. A combined food container and heater as set forth in claim 1, wherein the stamping includes a rim portion integral with the deformable arms, having a peripheral flanged portion adapted to snugly fit within the outer rim of the recess.

3. A combined food container and heater as set forth in claim 1, wherein the attaching arms connected to the fuel receptacle are arcuate in form, whereby the retracting movement of the fuel receptacle from its recessed position includes a rotary component.

4. A combined food container and heater, comprising a conventional can having a side wall and a substantially flat bottom portion spaced slightly from the lower edge of the side wall to form a recess, and a heating attachment comprising an integral stamping formed from sheet material and including a fuel receptacle having means for attaching the same to the can bottom, including a plurality of deformable arms integral with the receptacle, said receptacle being initially housed in said recess in the can bottom but being retractable therefrom.

5. A combined food container and heater, comprising a conventional can having a side wall and a substantially flat bottom spaced slightly from the lower edge of the side wall to form a recess, a fuel receptacle, and a set of deformable connecting members formed integral with said fuel receptacle and connected to the said can, said fuel receptacle being initially disposed in the recess of the can bottom but being retractable therefrom upon deformation of said connecting members to an operative position wherein the receptacle is spaced downwardly from said bottom to provide for said heating means a combustion space between the receptacle and the bottom of the can, said receptacle in its operative position coacting with said connecting members for positioning the can on a supporting surface.

6. A combined food container and heater, comprising a conventional can having a side wall, a substantially flat bottom spaced inwardly from the lower end of the side wall to form a recess, and an annular bead securing said bottom to said side wall, a heating attachment comprising a stamping including a receptacle, an annular member frictionally engaged with said annular bead, and a set of flat deformable connecting fingers connected at one end thereof to said annular member and at their other end to said receptacle, said receptacle being initially disposed in said recess in the can end but being retractable therefrom upon deformation of said fingers to an operative position wherein the receptacle is spaced downwardly from said bottom to provide for said heating means a combustion space between the receptacle and the bottom of the can.

7. The device as defined in claim 6 together with a perforate windshield slidably positioned on said can and having an overfold whereby to initially tightly encircle the side wall of the can, said windshield upon unfolding of said overfold being movable downwardly relative to the can to enclose said combustion space when said receptacle is in its operative position, and releasable means for retaining the overfold of said windshield in its initial position.

8. The device as defined in claim 6, wherein said annular member includes a rim portion embracingly engaging said annular bead.

9. A combined food container and heater, comprising a can having a side wall, a substantially flat bottom spaced slightly inwardly from the lower edge of the side wall to form a recess and an annular bead securing said bottom to said side wall, a receptacle having combustible heating means therein, an annular member carried by said annular bead, and a set of deformable connecting fingers connected at one end thereof to said annular member and at their other end to said receptacle, said receptacle being initially disposed in the recess of the can bottom but being retractable therefrom upon deformation of said fingers to an operative position wherein the receptacle is spaced downwardly from said bottom to provide for said heating means a combustion space between the receptacle and the bottom of the can.

10. The device as defined in claim 9 together with a perforate windshield slidably positioned on said can and having an overfold whereby to initially tightly encircle the side wall of the can, said windshield upon unfolding of said overfold being movable downwardly relative to the can to enclose said combustion space when said receptacle is in its operative position, and releasable means for retaining the overfold of said windshield in its initial position.

11. The device as defined in claim 9 wherein said annular member is channel-shaped and embracingly engages said annular bead.

12. A combined food container and heater, comprising a can having a side wall, a substantially flat bottom spaced slightly inwardly from the lower edge of the side wall to form a recess, a receptacle having combustible heating means therein, and a set of deformable connecting members provided on said receptacle and securing the same exteriorly to the bottom of said can, said receptacle being initially disposed in said recess but being retractable therefrom upon deformation of said connecting members to an operative position wherein the receptacle is spaced downwardly from said bottom to provide for said heating means a combustion space between the receptacle and the bottom of the can, said receptacle in its operative position coacting with said connecting members for positioning the can on a supporting surface.

13. The device as defined in claim 12 together with a perforate windshield slidably positioned on said can and having an overfold whereby to initially tightly encircle the can, said windshield upon unfolding of said overfold being movable downwardly relative to the can to enclose said combustion space when said receptacle is in its operative position, and releasable means for retaining the overfold of said windshield in its initial position.

14. The device as defined in claim 12 wherein said connecting members are elongated and secured at one end thereof to the marginal edge of said receptacle, said members being secured at their other end to said can.

15. The device as defined in claim 12 wherein said heating means comprise a body of combustible solid fuel and a wick embedded therein.

16. A device as set forth in claim 12 wherein said heating means comprises a solid fuel enclosed in a plastic cover.

17. A device as set forth in claim 16 wherein the cover is waterproof.

18. A device as set forth in claim 16 wherein the covering is formed of combustible material provided with a thin outer flange to serve as a wick or igniter for the fuel.

References Cited in the file of this patent

UNITED STATES PATENTS

| | | |
|---|---|---|
| 825,729 | Holsboer | July 10, 1906 |
| 1,021,531 | Jusse | Mar. 26, 1912 |
| 1,953,982 | Wygodsky | Apr. 10, 1934 |
| 2,643,650 | Miron | June 30, 1953 |
| 2,799,563 | Shenker | July 16, 1957 |
| 2,811,428 | Smith | Oct. 29, 1957 |

FOREIGN PATENTS

| | | |
|---|---|---|
| 73,654 | Austria | Aug. 10, 1917 |
| 62,750 | Denmark | Sept. 18, 1944 |
| 975,669 | France | Oct. 17, 1950 |
| 403,284 | Germany | Sept. 25, 1924 |
| 343,241 | Italy | Sept. 19, 1936 |
| 44,676 | Sweden | Oct. 30, 1918 |
| 251,344 | Switzerland | Aug. 2, 1948 |